(12) United States Patent
Linkous

(10) Patent No.: US 7,897,252 B1
(45) Date of Patent: Mar. 1, 2011

(54) SURFACES OF THERMOPLASTIC SHEETS AND STRUCTURES MODIFIED WITH PHOTOCATALYTIC MATERIALS

(75) Inventor: Clovis Alan Linkous, Merritt Island, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/077,712

(22) Filed: Mar. 20, 2008

Related U.S. Application Data

(62) Division of application No. 11/010,051, filed on Dec. 10, 2004, now Pat. No. 7,641,940.

(51) Int. Cl.
*B32B 5/16* (2006.01)

(52) U.S. Cl. ...................................... 428/323

(58) Field of Classification Search .................. 428/323
See application file for complete search history.

(56) References Cited

U.S. PATENT DOCUMENTS

| | | | | |
|---|---|---|---|---|
| 5,707,915 | A | * | 1/1998 | Taoda .......................... 502/159 |
| 6,455,465 | B1 | | 9/2002 | Miyasaka .................... 502/350 |
| 6,472,346 | B1 | | 10/2002 | Linkous ....................... 504/120 |
| 2002/0006425 | A1 | * | 1/2002 | Takaoka et al. ............. 424/405 |
| 2005/0065222 | A1 | | 3/2005 | Brady | |

OTHER PUBLICATIONS

Wilkins et al., Use Solar Energy to Drive Chemical Process, Jun. 1994, Chemical Engineering Progress, pp. 41-49.*
"Sigma Diagnosticcs® Glucose (HK) Procedure No. 16 UV" Sigma Chemical Company d.b.a Sigma Diagnostics (1995).
Linkous, et al. "Photcatalytic Inhibition of Algae Growth Using $TiO_2$, $WO_3$, and Cocatalyst Modifications." Environ. Sci. Technol. (2000) vol. 34 pp. 4754-4758.
"Sigma Diagnostic Gluclose (HK) Procedure No. 16 UV" Sigma Chemical Company d.b.a. Sigma Diagnostics (1995) 5 pages.
Linkous, et al., "Photocatalytic Inhibition of Algae Growth Using $TiO2$, $WO3$, and Cocatalyst Modifications." Environ. Sci. Technol. (2000) vol. 34, pp. 4754-4758.
Linkous, et al., "Effect of Photocatalytic Coatings on the Weathering of Elastomeric Roofing Membrane" Proceedings of the 15th Symposium on Improving Building Systems in Hot and Humid Climates, Jul. 24-26, 2006, Orlando, Florida, 4 pages.
Sigma Diagnostics, Sigma Diagnostics Glucose (HKk) Procedure No. 16 UV, 1995, Sigma Chemical Company.
Linkous, et al., Photocatalytic Inhibition of Algae Growth Using $TiO2$, $WO3$, and Cocatalyst Modifications, Environ. Sci. Technol., 2000, pp. 4754-4758, vol. 34.

* cited by examiner

*Primary Examiner*—Callie E Shosho
*Assistant Examiner*—Elizabeth Robinson
(74) *Attorney, Agent, or Firm*—Brian S. Steinberger; Law Offices of Brian S. Steinberger, P.A.

(57) ABSTRACT

Thermoplastic surface modification is achieved with photocatalysts, such as titanium dioxide, tungsten oxide and mixtures thereof. A uniform coating of a powdered photocatalyst is applied to a thermoplastic surface that is wetted with an organic solvent. The coating is in a range between approximately 1.5 mg/cm$^2$ to approximately 2.5 mg/cm$^2$. After the uniform coating of photocatalyst is dried, the thermoplastic surface is heated to a temperature above its softening temperature, usually in a range between approximately 80° C. to approximately 130° C.; then, a mild pressure is applied to imbed the photocatalyst into the surface of the thermoplastic sheet. The method of modification is inexpensive, long-lasting and non-detrimental to the thermoplastic surface. A surface is provided with improved aesthetic appearance, extended lifetime and sustained protection from undesirable growth of nuisance organisms, such as algae, fungus, bacteria, mold, mildew and the like.

9 Claims, No Drawings

SURFACES OF THERMOPLASTIC SHEETS AND STRUCTURES MODIFIED WITH PHOTOCATALYTIC MATERIALS

This application is a divisional of U.S. patent application Ser. No. 11/010,051 filed on Dec. 10, 2004, now U.S. Pat. No. 7,641,940, and claims the benefit of priority based on the U.S. Provisional Application Ser. No. 60/531,956 filed Dec. 23, 2003.

FIELD OF THE INVENTION

This invention relates to a coated sheet of material, and in particular to a thermoplastic surface coated with photocatalytic material, and to a process for making the same.

BACKGROUND AND PRIOR ART

Photocatalysts are known to have a decomposing function including deodorizing, antibacterial and soil-resisting actions, as well as a hydrophilic function. It is desirable to have the previously mentioned functionality on many household and environmental surfaces, including, but not limited to external walls of buildings, thermoplastic structures, swimming pools and roof tops where algae, fungus, bacteria, mold, and mildew have a tendency to collect.

There are many surfaces to which photocatalysts could be applied and much research is focused on developing application techniques with appropriate adhesion, bonding and durability on the finished product. U.S. Pat. No. 6,455,465 to Miyasaka describes an easy blasting treatment. Other prior art methods include oxidation of the surface to be treated, a sol-gel method, and immobilizing the photocatalyst in a binder that is then applied to the surface as a coating that requires replacement or repeated applications.

The photocatalyst coating methods of the prior art are also unsuitable for coating all surfaces that would benefit from having a photocatalytic surface, thus, there is a need for more coating methods that are inexpensive, long-lasting and not detrimental to a surface such as a thermoplastic or rubber-like material.

SUMMARY OF THE INVENTION

A primary objective of the invention is to provide a method by which photocatalytic powders are attached to a thermoplastic surface or sheet used in the construction of various manmade structures.

A secondary objective of the invention is to provide a thermoplastic sheet containing a firmly bound photocatalyst in active form.

A third objective of the invention is to provide a protective, inexpensive, long-lasting coating for a thermoplastic material exposed to fouling of its surface adjacent to freshwater and seawater areas.

A fourth objective of the invention is to provide a surface with improved aesthetic appearance, extended lifetime and sustained protection from undesirable growth of nuisance organisms, such as algae, fungus, bacteria, mold, mildew and the like.

A preferred method for applying a photocatalytic coating to a thermoplastic surface can include the steps of wetting a thermoplastic sheet with a solvent, applying a uniform coating of a photocatalyst that can include at least one of titanium dioxide $TiO_{n1}$ and tungsten oxide $WO_{n2}$, wherein $n1$ is approximately $0<n1<$ approximately 2, and $n2$ is approximately $0<n2<$ approximately 3, to the wet thermoplastic surface, heating the surface of a pressing means to a temperature above the softening temperature of the thermoplastic sheet, contacting the photocatalyst-coated thermoplastic sheet with the heated pressing device, applying a mild pressure to imbed the photocatalyst into the surface of the thermoplastic sheet until bonding occurs between the photocatalyst and the thermoplastic surface prior to removing the thermoplastic sheet bonded with photocatalyst from the heated press and cooling the bonded sheet, thereby providing a structural surface that is resistant to the growth of nuisance organisms.

The photocatalyst can be a dry photocatalyst powder or a slurry comprising a photocatalyst and a solvent; preferably an organic solvent, such as isopropanol, methanol, ethanol, benzene, acetone, and 1, 2-dichloroethane.

The preferred photocatalyst is titanium dioxide ($TiO_{n1}$) wherein $n1$ equals approximately 2, and tungsten oxide ($WO_{n2}$) wherein $n2$ equals approximately 3.

Preferably, the uniform coating of photocatalyst is accomplished by sifting a dry photocatalyst powder through a plurality of mesh screens; however, the uniform coating of photocatalyst can be accomplished by the application of a slurry comprising photocatalyst powder and solvent. The coating can be in a range between approximately 1.5 $mg/cm^2$ to approximately 2.5 $mg/cm^2$ on the thermoplastic surface. The preferred coating of photocatalyst is approximately 2.0 $mg/cm^2$ on the thermoplastic surface.

The preferred pressing means is a hot press wherein the apparatus is heated to a range between approximately 80° C. to approximately 130° C., more preferably to approximately 100° C.

The preferred thermoplastic sheet is selected from the group consisting of: polyethylene, polypropylene, polystyrene, polyester, polyvinyl chloride, thermoplastic polyolefin (TPO), acrylics, nylons, spandex-type polyurethanes and cellulosics, more preferably thermoplastic polyolefin (TPO), used for commercial roofing.

A preferred embodiment of the thermoplastic sheet can be modified with an imbedded photocatalyst that is resistant to nuisance organisms; the photocatalyst can be at least one of $TiO_{n1}$ and $WO_{n2}$, wherein $n1$ is approximately $0<1<$ approximately 2, and $n2$ is approximately $0<2<$ approximately 3.

A structural material having a surface that is resistant to the growth of nuisance organisms can include a thermoplastic sheet with a softening point above approximately 50° C. and a uniform coating of a photocatalyst, in active form.

The preferred thermoplastic sheet has a softening point in a range between approximately 80° C. to approximately 140° C. and is preferably a thermoplastic polyolefin (TPO) or poly vinyl chloride (PVC) and can be used for a roofing material.

The preferred photocatalyst can include at least one of titanium dioxide $TiO_{n1}$ and tungsten oxide $WO_{n2}$, wherein $n1$ is approximately $0<n1<$ approximately 2, and $n2$ is approximately $0<n2<$ approximately 3 or the photocatalyst can be a mixture of $TiO_{n1}$ and $WO_{n2}$, wherein $0<n1<$ approximately 2, and $0<n2<$ approximately 3. The photocatalyst can be imbedded in the thermoplastic sheet as a uniform coating loaded in a range between approximately 1.5 $mg/cm^2$ to approximately 2.5 $mg/cm^2$ on the thermoplastic surface, more preferably the uniform coating is loaded at a density of approximately 2.0 $mg/cm^2$ on the thermoplastic surface.

Further objects and advantages of this invention will be apparent from the following detailed description and examples of the presently preferred embodiments.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The invention provides an inexpensive method of modifying a thermoplastic sheet with a photocatalyst to render the surface of the thermoplastic material resistant to the growth of organisms, such as but not limited to algae, fungus, bacteria, mold and mildew.

Thermoplastic materials useful in this invention are chosen from the broad class of compounds known as polyethylene, polypropylene, polystyrene, polyester, polyvinyl chloride, thermoplastic polyolefin (TPO), acrylics, nylons, spandex-type polyurethanes and cellulosics. The thermoplastic is a material that will repeatedly soften when heated and harden to become rigid when cooled without any degradation of the material. For the present invention, the conventional thermoplastic material is in the form of a smooth sheet that has a softening point above approximately 50° C.; preferably in a range of from approximately 80° C. to approximately 140° C. Exemplary compositions useful in the present invention include, without limitation, thermoplastic polyolefin (TPO), and poly vinyl chloride, commercially available from Firestone Building Products, Inc.

Photocatalysts are well known to those skilled in the art as substances that help bring about a light-catalyzed reaction and function to decompose, kill, deodorize and inhibit the growth of nuisance organisms. Not wishing to be bound by any theory, it is believed that all photocatalysts would be suitable for the present invention; most preferably the commonly used photocatalysts, titanium dioxide ($TiO_2$) and tungsten oxide ($WO_3$), in powder form. The powder containing titanium as a major component is referred to as titanium oxide and includes those titanium compounds that have reacted with the atmospheric oxygen to have stable oxide layers identified as $TiO_{n1}$, wherein O is less than1 or equal to 2 ($0<n1<2$) and ($0<n2<3$).

Likewise, when the powder containing tungsten as a major component is referred to as tungsten oxide, included are those tungsten compounds that have reacted with the atmospheric oxygen to have stable oxide layers identified as $WO_{n2}$, wherein $0<n1<2$ and $0<n2<3$.

In contrast to prior art methods of painting or applying a slurry containing a polymer binder and solvent, which may not be compatible with the thermoplastic support, the following novel method is used.

First, the thermoplastic sheet of material is wetted with an appropriate solvent. Any suitable solvent can be used, including without limitation, saturated hydrocarbon solvents such as hexane, heptane and the like; other organic solvents, including isopropanol, methanol, ethanol, benzene, acetone, and 1,2-dichloroethane. A comparatively low volatility solvent, such as isopropanol, is preferred. In contrast, solvents that are less volatile but poorly wetting, such as water, are to be avoided. The surface of the thermoplastic sheet is thoroughly wetted and kept in that state until the photocatalyst powders or slurry can be applied.

When using the photocatalyst powder in a dry state, the powder is sifted through a number of mesh screens to break up agglomerates and achieve uniform particle size. The photocatalyst powder consists of titanium dioxide particles, tungsten oxide particles or a mixture thereof. The photocatalyst powder is then sprinkled or blown onto the wet, possibly gummy, thermoplastic surface to achieve a uniform coating. Sufficient photocatalyst is sifted and sprinkled to achieve a uniform loading of approximately 2 $mg/cm^2$. A sedimentary photocatalyst powder loading achieves maximum efficiency at a loading density between approximately 1 $mg/cm^2$ to approximately 2.5 $mg/cm^2$. As loading density falls below 1 $mg/cm^2$, substantial gaps appear between adjacent particles, so that light rays pass between them and are lost in the substrate beneath. As loading density rises above 2 $mg/cm^2$, interstitial gaps are closed and particles begin to pile on top of each other, so that the outer surface grains absorb and reflect the incoming light, plus prevent the lower photocatalyst layers from receiving air and water, which are vital for the performance of the photocatalytic function.

In some instances, the photocatalyst powder may be too fine or agglomerate too readily to be applied via a sieving and sprinkling action. Another problem that can arise is when mixtures of photocatalyst powders of dissimilar particle size do not blend well in the dry state, the result can be an inhomogeneous mixture. In those cases, it is preferable to slurry or suspend the photocatalyst powders in the wetting solvent beforehand, and then apply the suspension via spraying or brushing onto the membrane, then allowing the sprayed or brushed on slurry to dry. This will result in a more homogeneous distribution of photocatalyst across the surface of the membrane. There is no need to add a polymeric binder to the suspension, since the thermoplastic membrane support itself will effectively become the binding agent in a subsequent step of the fabrication procedure.

After loading a uniform coating of photocatalyst powder or slurry on the thermoplastic sheet, the platens of a hot press are heated to just above the softening temperature of the thermoplastic sheet. Excessive heat is to be avoided; too high a temperature can result in distortion of the sheet material when subjected to even mild pressure from the hot press. A process modification that would change the lateral dimensions of the thermoplastic sheet due to plastic flow would be unacceptable, since certain materials, such as, roof barriers are formed by butting and welding adjacent sheets together. Too low a temperature will prevent the press from bonding the photocatalyst to the thermoplastic sheet. Therefore, only temperatures within a certain range should be applied to the system. A temperature of between approximately 80° C. to approximately 130° C. may be applied; a temperature of approximately 100° C. is preferred. This temperature represents a compromise between softening the outer surface of the thermoplastic sheet so that the photocatalyst may be imbedded into it, and at the same time significant plastic flow of the polymer sheet is avoided.

Following the heating of the hot press or similar pressing means, the powder-coated sheet is carefully placed in the hot press or heated pressing means and put under mild pressure. Too high a pressure for too long a time will also cause the thermoplastic support to flow, widening the sheet well beyond its original dimensions. Using the approximately 100° C. applied temperature mentioned above, the acceptable applied pressure is approximately 30 $lb/in^2$ (psi); preferably in a range from approximately 24 $lb/in^2$ to approximately 36 $lb/in^2$ when the thermoplastic sheet is thermoplastic polyolefin (TPO). With the application of temperature and pressure as specified above, the photocatalyst powders or slurry are impressed or embedded into the surface of the thermoplastic sheet. The exposure time is approximately one minute. Significantly less time would limit the extent of bonding of the photocatalyst to the surface, while more time would eventually allow the press to heat through the entire sheet and effect plastic flow. Thus, it is understood by persons skilled in the art, that a longer time at a lower pressure could be used to accomplish the desired results as the use of a shorter time and a higher pressure. Thus, a judicious selection of temperature, time and pressure is required and is dependent on the selection of thermoplastic material, and not a limitation of the present invention. Upon cooling, the thermoplastic sheet contains the firmly bound photocatalyst in active form. Excess, unbonded photocatalyst is wiped away with an isopropanol wash, and the amount of embedded photocatalyst is determined gravimetrically after drying. It may be necessary to repeat the above process one or two additional times to achieve the optimum photocatalyst surface density of approximately 1 mg/cm$^2$ to approximately 2.5 mg/cm$^2$.

The Example below provides further detail on the preparation of a sample of the photocatalyst imbedded thermoplastic material of this invention. The results of testing the efficacy of the novel material are shown in Tables I and II, which document the ability of the coated surface to inhibit undesirable plant growth by the consumption of glucose, a known by-product of photosynthesis or plant cell growth.

EXAMPLE

A 2 inch×2 inch square of poly vinyl chloride (PVC) roofing membrane, obtained from Firestone Building Products, Inc., is wetted by drop-wise addition of benzene solvent. Titanium dioxide (TiO$_2$) photocatalyst (Fisher Scientific) is passed through a 1.0 mm sifter and then into a fine mesh bag (0.1-0.25 mm). The bag is shaken over the wetted substrate until the photocatalyst powder works its way completely through and falls onto the substrate, making a loose, but evenly distributed, coating.

The coated but unfixed substrate is placed in a hot press at 1000 lb (250 pounds per square inch applied pressure) and heated to 110° C. for approximately 10 minutes. The time, temperature and pressure are selected and suitable for the poly vinyl chloride (PVC) substrate. The photocatalyst-laden substrate is then placed in a square flat cell (5 inches×5 inches), to which is added 100 ml of a 10.0 mM glucose (dextrose; Sigma) solution. The solution is purged with O$_2$ gas for 10 minutes. The cell is then placed in front of a 1000-Watt xenon (Xe) lamp filtered by a 10 cm water filter, and photolyzed for an hour. At that point, 15 ml of the photolyzed solution are removed and sampled for glucose analysis.

Glucose concentration after photolysis was determined via the hexokinase, or HK method as described in a technical service brochure entitled, "Sigma Diagnostics® Glucose (HK) Procedure No. 16 UV" Sigma Chemical Company d.b.a. Sigma Diagnostics (1995). Glucose is converted by the hexokinase enzyme in the presence of adenosine triphosphate (ATP) into glucose-6-phosphate, which then reacts with nicotinamide adenine dinucleotide (NAD$^+$) via glucose 6-phosphate dehydrogenase (G-6-PDH) to form 6-phosphogluconate and nicotinamide adenine dinucleotide oxidoreductase (NADH). Glucose concentration is then determined by NADH optical absorption at 340 nanometers (nm). A kit containing all the necessary reagents is obtained from Sigma. Standard solutions gave results within 2% of theory. This method had been used successfully in previous studies of photocatalyst activity (C. A. Linkous, G. J. Carter, D. B. Locuson, A. J. Ouellette, D. K. Slattery, and L. A. Smitha, "Photocatalytic Inhibition of Algae Growth Using TiO$_2$, WO$_3$, and Cocatalyst Modifications, *Environ. Sci. Technol.*, 34 (2000) 4754-4758).

The percent of glucose consumed during the photolysis was determined as $$\% \text{ glucose consumption} = \frac{A_d - A_l}{A_g - A_{HK}} \times 100$$

where $A_d$=NADH absorbance of unphotolyzed solution containing glucose and photocatalyst $A_l$=NADH absorbance of photolyzed solution containing glucose and photocatalyst $A_g$=NADH absorbance of HK-converted glucose solution, without photocatalyst or light.

$A_{HK}$=background absorbance of hexokinase solution.

Values for the various parameters shown in the equation above are given in Table 1.

TABLE I

NADH Absorbance Values Used in
Glucose Determination

| Sample ID | NADH absorbance |
|---|---|
| $A_d$ | 2.781 |
| $A_l$ | 2.563 |
| $A_g$ | 2.869 |
| $A_{HK}$ | 0.054 |

Based on these values, 7.74% of the glucose is consumed by the action of light on the hot-pressed, immobilized photocatalyst. This result is quite comparable, and in most cases, superior, to the activity of other TiO$_2$ photocatalyst formulations where solubilized polymer binders are slurried with photocatalyst and painted onto a substrate. Results are shown in Table 2 below.

TABLE II

Comparison of Activity for Various Immobilized Photocatalyst
Formulations
1 Hour Photolysis Trials

| Sample | NADH Abs | % Glucose Consumption |
|---|---|---|
| TiO$_2$/PVC membrane | 2.563 | 7.74 |
| PVC membrane only | 2.801 | 0.0 |
| 30% PMMA, 70% TiO$_2$/cement | 2.549 | 5.46 |
| 30% PC, 70% TiO$_2$/cement | 2.638 | 2.13 |
| 30% PTFE, 70% TiO$_2$/cement | 2.37 | 12.14 |
| 30% EPDM, 70% TiO$_2$/cement | 2.518 | 6.4 |
| cement substrate only | 2.625 | 0.31 |

PVC = poly (vinyl chloride)
PMMA = poly (methyl methacrylate)
PC = polycarbonate
PTFE = poly (tetrafluoroethylene)
EPDM = ethylene-propylene diene monomer Only PTFE yielded a better result. Even then, the PTFE formulation was mechanically quite weak and would not be able to withstand long-term outdoor exposure, not to mention its greater expense in comparison to non-fluorinated polymers.

The disclosed method of the present invention represents an inexpensive way of modifying a thermoplastic sheet with a photocatalyst so that the sheet has a desirable function in manmade structures, such as roof tops, outside walls, swimming pools, and the like. A loading of 2 mg/cm$^2$ means that one pound of material would cover 243 ft$^2$, at a materials cost of approximately $1.00 (valued in year 2003).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A thermoplastic sheet selected from the group consisting of:
   thermoplastic polyolefin (TPO) and polyvinyl chloride (PVC) modified with an imbedded photocatalyst on one wetted surface side a thermoplastic surface comprising $TiO_{n1}$, wherein $0<n1<2$, and the imbedded photocatalyst comprising wetted particles having sizes of 0.1 to 0.25 mm, the wetted particles having a uniform coating that has been loaded in a range between approximately 1.5 mg/cm$^2$ to approximately 2.5 mg/cm$^2$ on the wetted one side of the thermoplastic surface to form a modified thermoplastic Sheet, the modified thermoplastic sheet having a modified surface that is resistant to the growth of nuisance organisms including damaging algae, fungus, bacteria, mold and mildew.

2. The thermoplastic sheet of claim 1, wherein the uniform coating on the modified thermoplastic sheet is loaded at a density of approximately 2.0 mg/cm$^2$ on the thermoplastic surface.

3. The thermoplastic sheet of claim 1, wherein the wetted particles include solvent wetted particles.

4. A structural material having a surface that is resistant to the growth of nuisance organisms, comprising:
   a) a thermoplastic sheet with a softening point above approximately 50° C. selected from a group consisting of thermoplastic polyolefin (TPO) and polyvinyl chloride (PVC), thermoplastic sheet having one wetted surface side; and
   b) a uniform coating of a photocatalyst, in active form heat imbedded into a surface of the thermoplastic sheet, the photocatalyst selected from the group consisting of a wetted mixture of $TiO_{n1}$, wherein $0<n1<2$, and the photocatalyst wetted mixture having particle sizes of 0.1 to 0.25 mm to form the uniform coating, the uniform coating loaded in a range between approximately 1.5 mg/cm$^2$ to approximately 2.5 mg/cm$^2$ on the wetted one side of the thermoplastic surface.

5. The structural material of claim 4, wherein the thermoplastic sheet has a softening point in a range between approximately 80° C. to approximately 140° C.

6. The structural material of claim 4, wherein the uniform coating is loaded at a density of approximately 2.0 mg/cm$^2$ on the thermoplastic surface.

7. The structural material of claim 4, wherein the wetted photocatalyst mixture is a solvent wetted photocatalyst mixture.

8. The structural material of claim 4, wherein the wetted surface of the thermoplastic sheet is a solvent wetted surface.

9. A thermoplastic sheet, comprising:
   thermoplastic polyolefin (TPO) and polyvinyl chloride (PVC) modified with an imbedded photocatalyst on one wetted surface side a thermoplastic surface comprising $TiO_{n1}$, wherein $0<n1<2$, the imbedded photocatalyst comprising wetted particles having sizes of 0.1 to 0.25 mm, the wetted particles having a uniform coating that has been loaded in a range between approximately 1.5 mg/cm$^2$ to approximately 2.5 mg/cm$^2$ on the wetted one side of the thermoplastic surface to form a modified thermoplastic sheet, the modified thermoplastic sheet having a modified surface that is resistant to the growth of nuisance organisms including damaging algae, fungus, bacteria, mold and mildew.

* * * * *